United States Patent
Tinnin

(10) Patent No.: US 8,430,428 B2
(45) Date of Patent: Apr. 30, 2013

(54) STEERING COLUMN ASSEMBLY COMPRISING A MOUNTING CAPSULE

(75) Inventor: Melvin Lee Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 432 days.

(21) Appl. No.: 12/650,661

(22) Filed: Dec. 31, 2009

(65) Prior Publication Data

US 2011/0006509 A1    Jan. 13, 2011

Related U.S. Application Data

(60) Provisional application No. 61/142,405, filed on Jan. 5, 2009.

(51) Int. Cl.
*B62D 1/19* (2006.01)

(52) U.S. Cl.
USPC .............................. 280/779; 248/900; 188/371

(58) Field of Classification Search .................. 280/777, 280/779, 780; 248/548, 900; 74/492; 188/371, 188/376
See application file for complete search history.

(56) References Cited

U.S. PATENT DOCUMENTS

| | | | | |
|---|---|---|---|---|
| 3,392,599 | A * | 7/1968 | White .............................. | 74/492 |
| 3,868,864 | A * | 3/1975 | Durkee et al. .................. | 74/492 |
| 4,452,096 | A | 6/1984 | Workman | |
| 4,884,778 | A | 12/1989 | Yamamoto | |
| 4,943,028 | A * | 7/1990 | Hoffmann et al. ............ | 248/548 |
| 5,390,955 | A * | 2/1995 | Kaliszewski et al. ......... | 280/777 |
| 5,673,938 | A | 10/1997 | Kaliszewski | |
| 5,704,641 | A | 1/1998 | Shimizu et al. | |
| 5,788,279 | A | 8/1998 | Pfannebecker | |
| 5,899,116 | A * | 5/1999 | Armstrong et al. ............. | 74/492 |
| 5,979,860 | A * | 11/1999 | Jurik et al. ..................... | 248/548 |
| 6,062,100 | A * | 5/2000 | Sarsfield et al. ................ | 74/492 |
| 6,176,151 | B1 * | 1/2001 | Cymbal .......................... | 74/492 |
| 6,378,903 | B1 | 4/2002 | Yabutsuka et al. | |
| 6,419,269 | B1 | 7/2002 | Manwaring et al. | |
| 6,474,690 | B1 | 11/2002 | Marxer et al. | |
| 6,761,376 | B2 * | 7/2004 | Riefe et al. ..................... | 280/777 |
| 6,851,712 | B2 | 2/2005 | Park et al. | |
| 7,228,755 | B2 | 6/2007 | Armstrong et al. | |
| 7,360,793 | B2 * | 4/2008 | Hoshino et al. ............... | 280/777 |
| 7,367,588 | B2 * | 5/2008 | Yamada ......................... | 280/777 |
| 2005/0200113 | A1 * | 9/2005 | Cymbal et al. ................ | 280/777 |
| 2005/0269812 | A1 * | 12/2005 | Yamada ......................... | 280/777 |
| 2006/0226646 | A1 * | 10/2006 | Armstrong et al. ........... | 280/777 |
| 2009/0090210 | A1 * | 4/2009 | Menjak et al. .................. | 74/492 |
| 2011/0006509 | A1 * | 1/2011 | Tinnin .......................... | 280/779 |

OTHER PUBLICATIONS

European Search Report dated Jun. 27, 2011 for European Application No. 10000041.3.

* cited by examiner

*Primary Examiner* — Paul N Dickson
*Assistant Examiner* — Karen Beck
(74) *Attorney, Agent, or Firm* — Cantor Colburn LLP

(57) ABSTRACT

The instant invention includes a mounting capsule for a steering column assembly of a vehicle. The mounting capsule has a first capsule portion and a second capsule portion coupled together during normal operation. The first capsule portion includes a first arm and a second arm each having a first taper and a second taper. The second capsule portion includes a first groove and a second groove tapered in a complimentary configuration to the first and second arm for receiving the first and second arm. Frictional forces between the first and second capsule portions aid in coupling the first and second capsule portions and effectively reduce lateral and vertical movement in a steering column assembly during operation. Upon an impact event exerting a predetermined impact force the first and second capsule portions disengage allowing the steering column assembly to collapse.

19 Claims, 12 Drawing Sheets

STEERING COLUMN ASSEMBLY COMPRISING A MOUNTING CAPSULE

CROSS REFERENCE TO RELATED APPLICATION

This application claims the benefit of U.S. Patent Application Ser. No. 61/142,405, filed Jan. 5, 2009, the contents of which are incorporated herein by reference.

FIELD OF THE INVENTION

The subject invention generally relates to a steering column assembly for a vehicle and, more specifically, to a mounting capsule of the steering column assembly.

BACKGROUND

It is in the art that a steering column assembly for a vehicle typically includes an outer jacket defining a longitudinal axis, an inner jacket disposed along the longitudinal axis, a bracket coupled to the outer or inner jacket, and a mounting capsule. Generally, the mounting capsule allows the bracket coupled to the outer or inner jackets to be mounted to the vehicle. The mounting capsule secures the steering column assembly to the vehicle in a stable operating position.

The mounting capsule further serves as a safety device during an impact event, such as a vehicular crash. The driver typically impacts the steering wheel and thus the steering column assembly during the impact event. The driver exerts a force on the steering column assembly along the longitudinal axis. Application of a predetermined impact force on the steering column assembly along the longitudinal axis will typically separate the mounting capsule from the steering column assembly which releases the steering column assembly from the stable operating position, allowing the steering column assembly to collapse along the longitudinal axis. Separation of the mounting capsule and collapse of the steering column assembly absorbs energy from the driver exerting the force on the steering column assembly and prevents serious injury to the driver from impacting the column assembly.

SUMMARY

In an exemplary embodiment, a steering column assembly comprises an outer jacket defining a longitudinal axis, an inner jacket disposed along the longitudinal axis within the outer jacket and a bracket coupled to one of the jackets. A first capsule portion is coupled to the bracket and includes a first central body and first and second arms each having a periphery and being spaced from each other with the first central body disposed therebetween. A second capsule portion is coupled to the first capsule portion. The second capsule portion defines a first groove and a second groove that are spaced from each other and extend along the longitudinal axis with the first arm disposed in the first groove and the second arm disposed in the second groove. The first and second arms each define a first taper extending from the periphery toward the first central body for reducing relative lateral movement of the inner and outer jackets.

In another exemplary embodiment a steering column assembly for a vehicle comprises an outer jacket defining a longitudinal axis, an inner jacket disposed along the longitudinal axis within the outer jacket and a bracket coupled to one of the jackets. A first capsule portion is coupled to the bracket and including a first central body and first and second arms each having a periphery and being spaced from each other with the first central body disposed between the first and second arms. A second capsule portion is coupled to the first capsule portion. The second capsule portion defines a first groove and a second groove spaced from each other and extending along the longitudinal axis with the first arm disposed in the first groove and the second arm disposed in the second groove. The first central body further comprises a first body end defining a first recess portion and the second central body further comprising a second body end defining a second recess portion facing the first recess portion when the first and second capsule portions are coupled together to define an aperture for receiving a mounting device to couple the bracket to the vehicle.

In yet another embodiment, a steering column mounting apparatus for a vehicle comprises an outer jacket defining a longitudinal axis, an inner jacket disposed along the longitudinal axis within the outer jacket and a bracket coupled to one of the jackets. A first capsule portion is coupled to the bracket and includes a first central body and first and second arms extending from the first central body in spaced relation from each other, each of the first and second arms having an outer periphery. A second capsule portion is coupled to the first capsule portion. The second capsule portion defines first and second grooves extending in spaced relation from each other and extending along the longitudinal axis with the first arm disposed in the first groove and the second arm disposed in the second groove. A restraint device engages a first receiver defined by the first arm and is configured to operatively restrain the second capsule portion in engagement with the first capsule portion and is disengageable from the first and second capsule portions upon application of a predetermined impact force to the steering column along the longitudinal axis.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
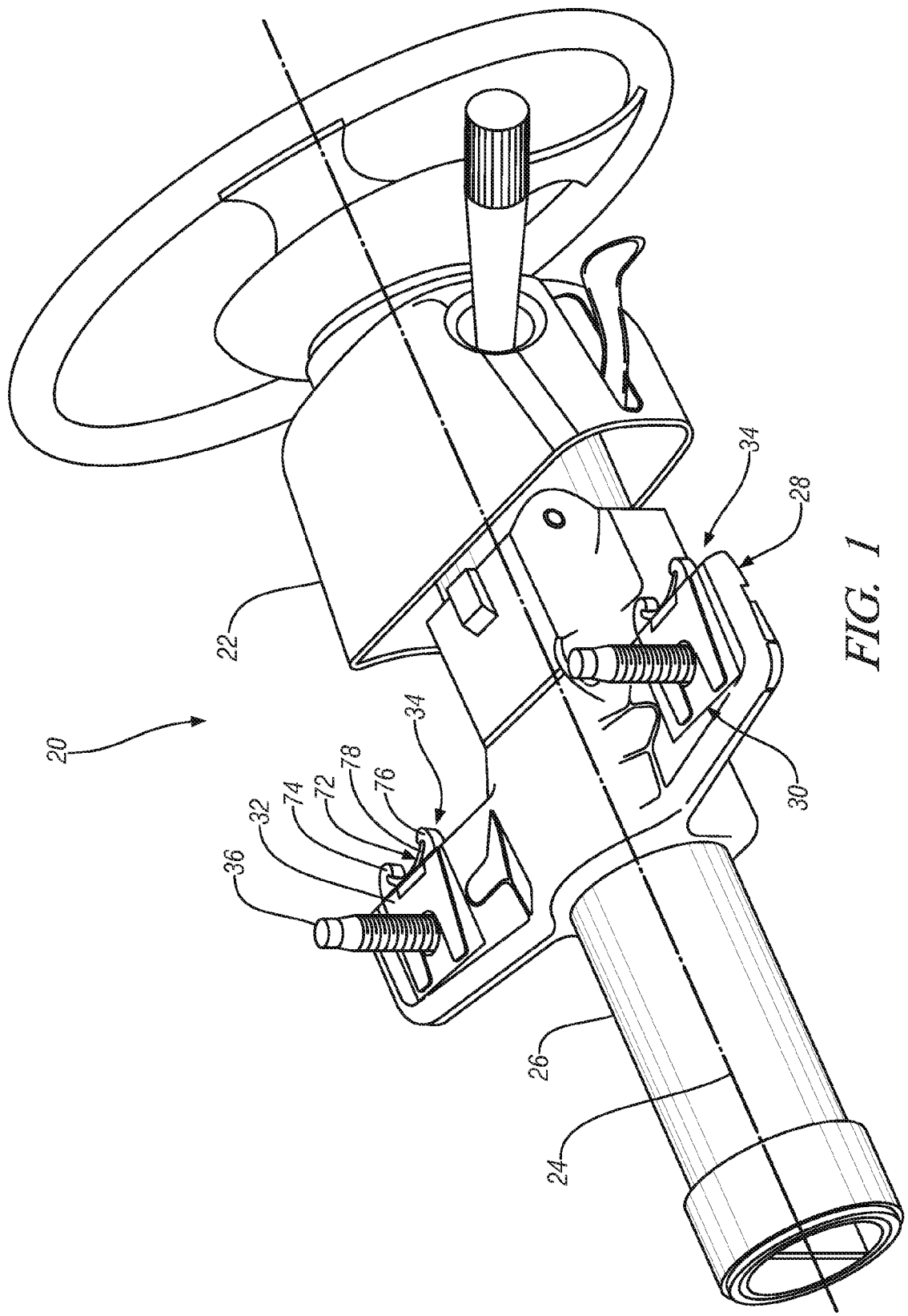
FIG. 1 is a perspective view of a steering column assembly according to the invention.

The following description is merely exemplary in nature and is not intended to limit the present disclosure, application or uses. It should be understood that throughout the drawings, corresponding reference numerals indicate like or corresponding parts and features.

Referring to the Figures, wherein like numerals indicate like or corresponding parts throughout the several views, a steering column assembly is shown generally at 20 in FIG. 1. The steering column assembly 20 is intended for use within a vehicle (not shown). The steering column assembly 20 generally includes an outer jacket 22 defining a longitudinal axis 24 and an inner jacket 26 disposed along the longitudinal axis 24 within the outer jacket 22. It should be appreciated that "within" as used in context with the outer and inner jackets 22, 26 describes the outer jacket 22 totally or partially encasing the inner jacket 26, each parallel in orientation and running along the longitudinal axis 24. A bracket 28 is coupled to the outer or inner jacket 22, 26. A first capsule portion 30, FIG. 2, is coupled to the bracket and a second capsule portion 32 is coupled to the first capsule portion 30 (collectively referred to as "the mounting capsule" 34).

Referring to FIG. 1 the steering column assembly 20 embodying the present invention utilizes at least one and preferably two mounting capsules 34 for generally attaching the bracket 28 supporting the outer or inner jacket 22, 26 to a mounting device 36 that is rigidly fixed to the vehicle. The mounting device 36 is rigidly fixed to the vehicle in a manner which prevents any movement or disengagement of the mounting device 36 from the vehicle.

Figure 2:
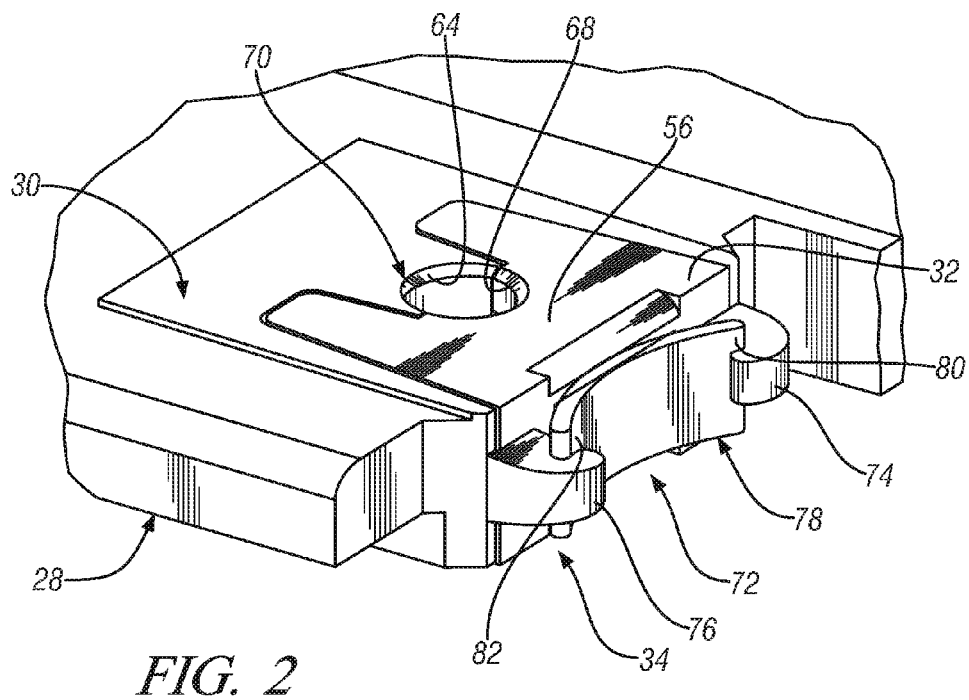
FIG. 2 is a perspective view of a first capsule portion coupled to a second capsule portion biased together by a restraining device comprising a spring.
Figure 3:
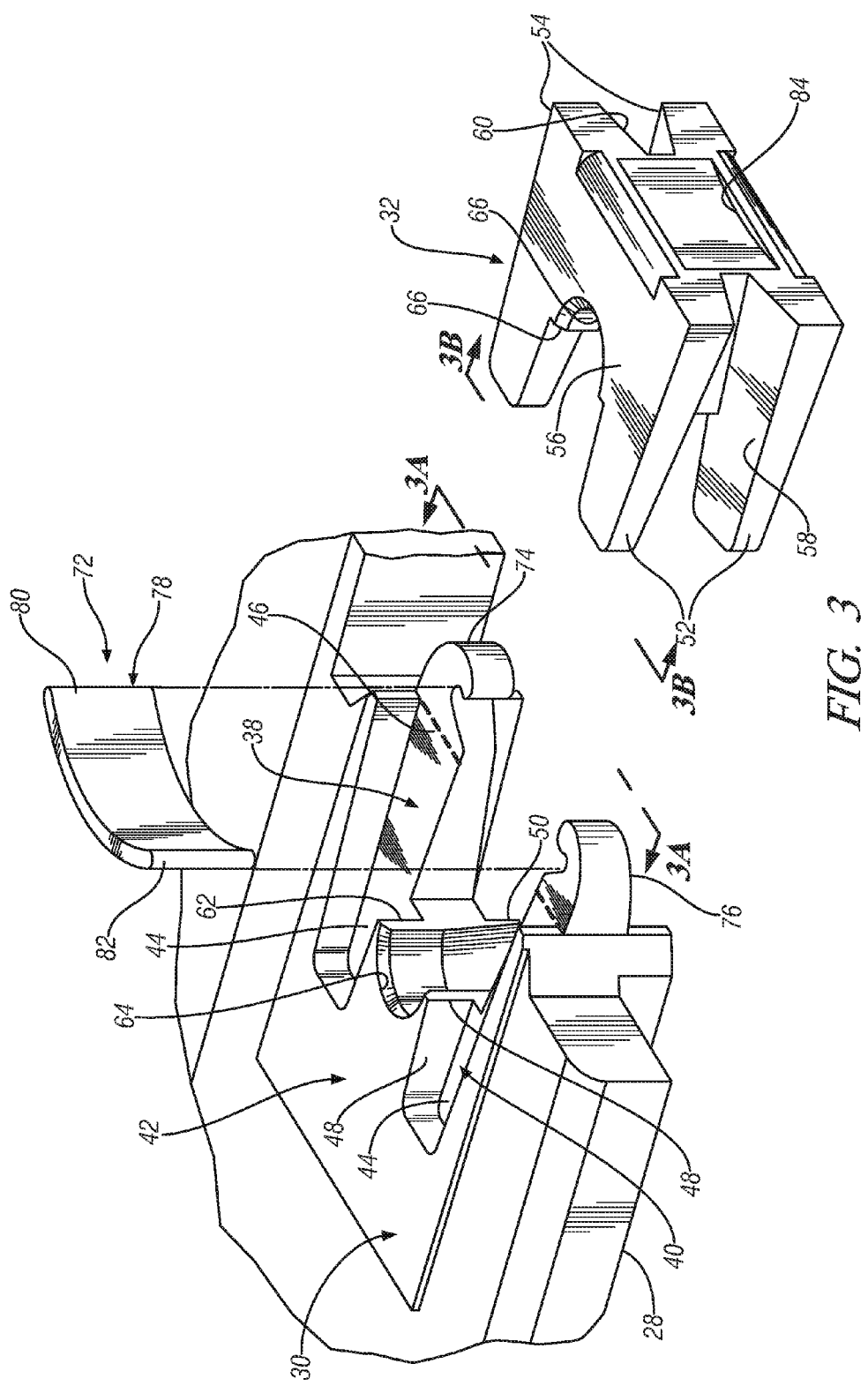
FIG. 3 is a partially disassembled view of the first capsule portion, the second capsule portion, and the restraining device comprising the spring of FIG. 2.

Referring to FIGS. 2 and 3, the first capsule portion 30 is coupled and preferably integrated into the bracket 28 such that the first capsule portion 30 and the bracket 28 are manufactured as a single part. The first capsule portion 30 includes a first arm 38 and a second arm 40 each having a periphery as best seen in FIG. 3. A first central body 42 is disposed between and associated with the first and second arms 38, 40.

The first and second arms 38, 40 are associated with the first central body 42 and extend substantially in parallel to one another and along the longitudinal axis 24.

The first and second arms 38, 40 each define a first arm end 44 adjacent the first central body 42 and a second distal arm end 46 spaced away from the first central body 42. The first central body 42 includes a first raised portion 48 extending above the first and second arms 38, 40 and a second raised portion 50 extending below the first and second arms 38, 40, FIG. 3B.

Preferably, the first capsule portion 30 comprises a metal, and preferably steel, however, it should be appreciated that the first capsule portion 30 may comprise other suitable materials such as an alloy, plastic, or suitable material known in the art.

Figure 3A:
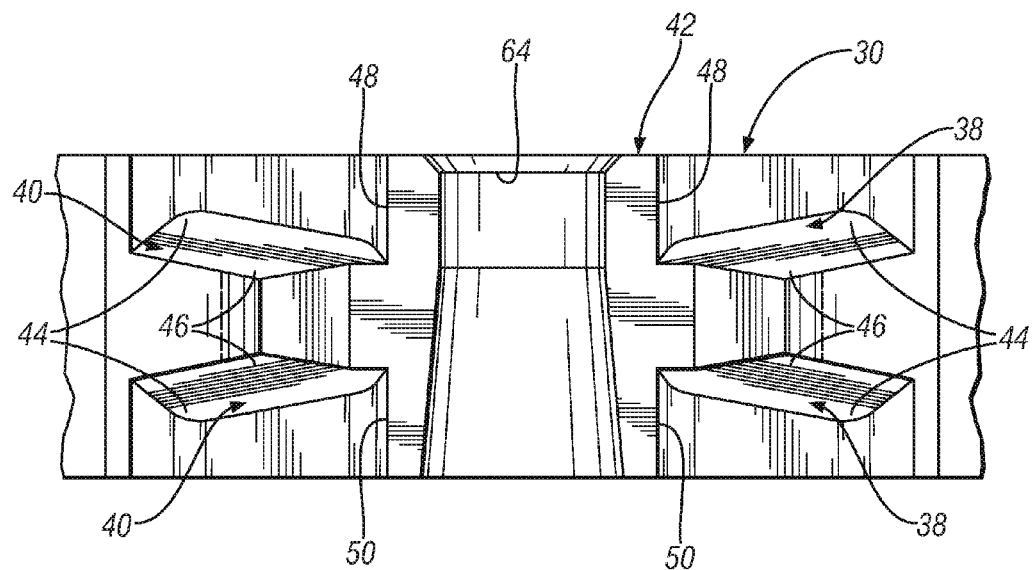
FIG. 3A is a front of the first capsule portion taken at line 3A-3A of FIG. 3.

Referring to FIG. 3A the first and second arms 38, 40 each define a first taper extending from the outer peripheries towards the first central body 42. The taper extends in a generally laterally declining angle from the longitudinal axis 24. The first taper reduces relative lateral movement of the outer and inner jackets 22, 26 and the steering column assembly 20, in reference to the vehicle, during operation of the vehicle. Preferably the first taper uniformly extends from the peripheries towards the first central body 42; however, it should be appreciated that the first taper can partially extend from the peripheries towards the first central body 42.

The first and second arms 38, 40 define a second taper extending longitudinally from the first arm end 44 towards the second distal end 46. The second taper reduces relative vertical movement of the steering column assembly 20, in reference to the vehicle, during operation of the vehicle. Preferably the second taper uniformly extends from the first arm end 44 towards the second distal arm end 46; however, it should be appreciated that the first taper can partially extend from the first arm end 44 towards the second distal arm end 46.

Figure 3B:
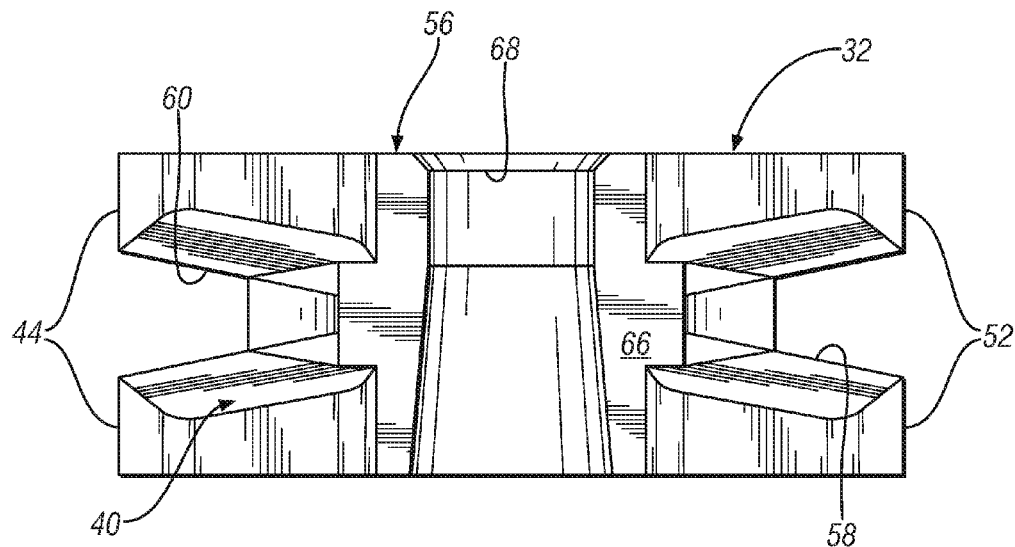
FIG. 3B is a front view of the second capsule portion taken at line 3B-3B of FIG. 3.

Referring to FIG. 3B the second capsule portion 32 comprises a first set of fingers 52 and a second set of fingers 54. A second central body 56 is disposed between and associated with the first and second set of fingers 52, 54. The first set of fingers 52 defines a first groove 58 and the second set of fingers 54 define a second groove 60. The first and second set of fingers 52, 54 and the first and second groove 58, 60 extend from the second central body 56 substantially parallel with the longitudinal axis 24. The first and second grooves 58, 60 are tapered in a complementary configuration to the first and second arms 38, 40 for receiving the first and second arms 38, 40. When the first capsule portion 30 is coupled to the second capsule portion 32 the first and second arms 38, 40 are disposed in the first and second grooves 58, 60, respectively. When the first capsule portion 30 is coupled to the second capsule portion 32 the first and second set of fingers 52, 54 engage and abut the first and second raised portions 48, 50.

Preferably, the second capsule portion 32 comprises a metal, and preferably steel, however, it should be appreciated that the second capsule portion 32 can comprise other suitable materials such as an alloy, plastic, or other suitable material known the art.

The first and second tapers are angled, according to the materials used, to form the first and second capsule portions 30, 32. The angle is determined by a coefficient of friction of the material that resists the first capsule portion 30 from separating from the second capsule portion 32 after the first and second capsule portions 30, 32 are coupled together.

Figure 4:
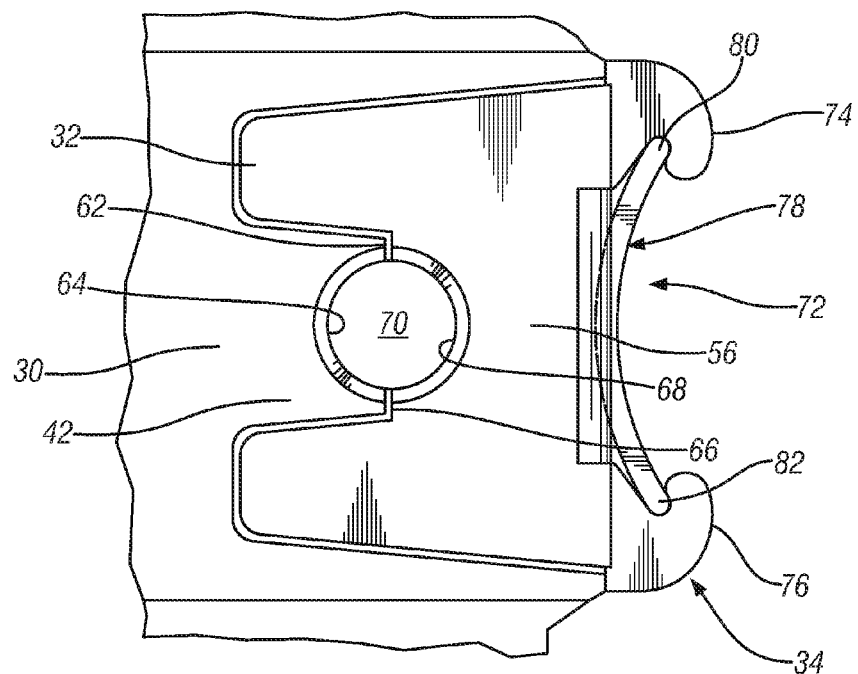
FIG. 4 is a top view of the first capsule portion coupled to the second capsule portion biased together by the restraining device comprising the spring.

Referring additionally to FIG. 4, the first central body 42 comprises a first body end 62 defining a first recess 64 and the second central body 56 comprises a second body end 66 defining a second recess 68. When the first and second capsule portions 30, 32 are coupled together the first recess 64 faces the second recess 68 to define an aperture 70 for receiving the mounting device 36 to couple the bracket 28 to the vehicle.

Figure 5:
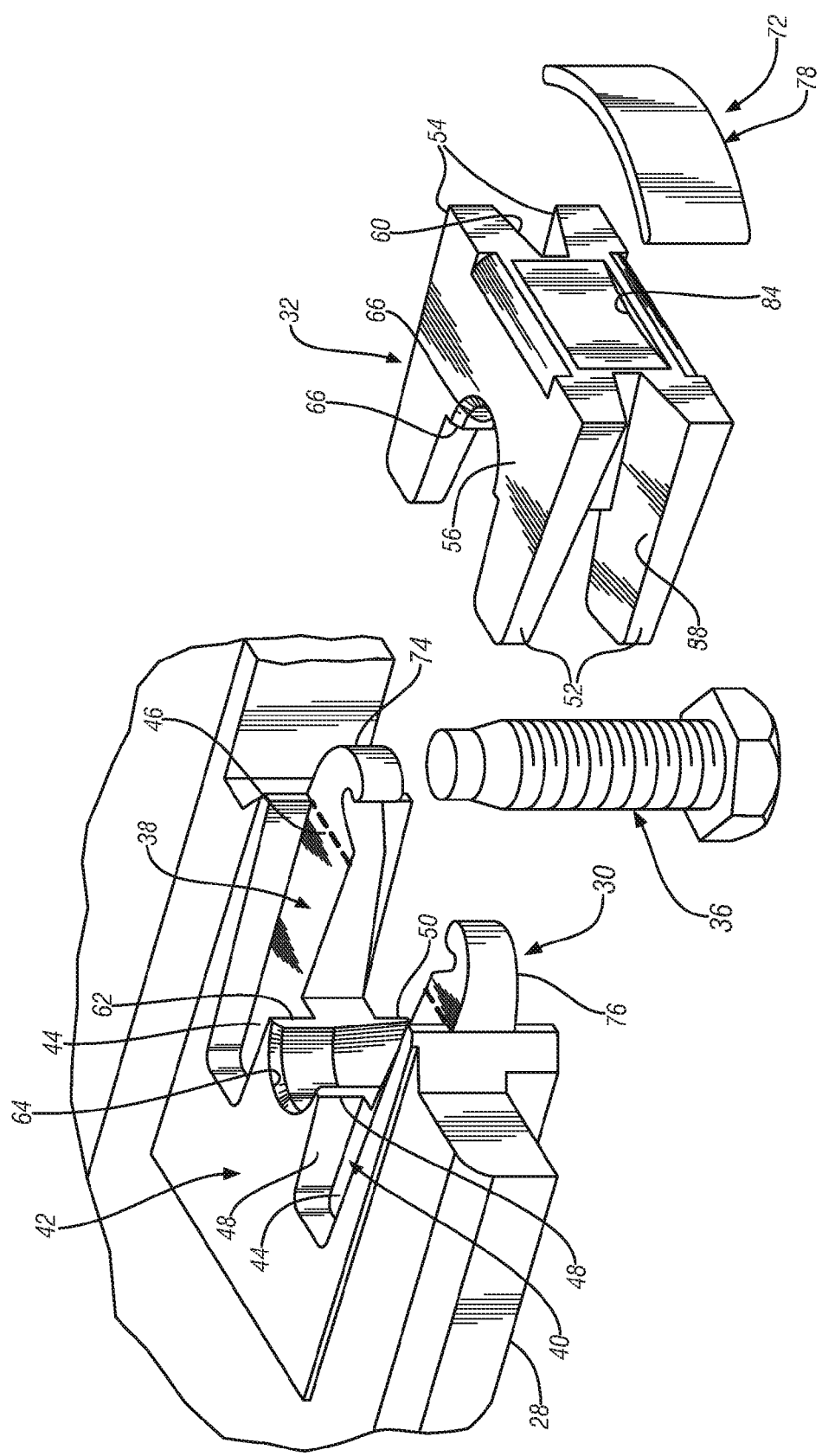
FIG. 5 is a partially disassembled perspective view illustrating the second capsule portion disengaged from the first capsule portion.

Referring to FIG. 5 a restraint device 72 operatively restrains the first and second capsule portions 30, 32 together and disengages from the first second capsule portions 30, 32 upon application of a predetermined impact force along the longitudinal axis 24. However, it should be appreciated that the restraint device 72 may restrain or urge the first and second capsule portions 30, 32 together. It should also be appreciated that the first and second capsule portions 30, 32 can remain coupled independent of the restraint device 72. The first arm 38 of the first capsule portion 30 defines a first receiver 74 and the second arm 40 of the first capsule portion 30 defines a second receiver 76. The first and second receivers 74, 76 begin at the phantom line as seen in FIGS. 3 and 5. The restraint device 72 is mounted to the first and second receivers 74, 76. The restraint device 72 comprises a spring 78 having a first restraint end 80 and a second restraint end 82 opposite the first restraint end. Preferably the spring 78 is a leaf spring that operates to bias the second capsule portion 32 into engagement with the first capsule portion 30. The first restraint end 80 is mounted to the first receiver 74 and the restraint end 82 is mounted to the second receiver 76. The spring 78 engages the second central 56 of the second capsule portion 32 for restraining the second capsule portion 32 in engagement with the first capsule portion 30. The second capsule portion 32 may define a void 84 to facilitate mounting the restraint device 72 to the first capsule portion 30.

Preferably, the spring 78 comprises a resilient material, and preferably spring steel; however, it should be appreciated that the spring 78 may comprise other suitable materials such as an alloy, plastic, or suitable material known in the art.

The restraint device 72 disengages from the first and second receivers 74, 76 in response to the predetermined impact force. The first and second capsule portions 30, 32 disengage allowing for collapse of the steering column assembly 20 during an impact event.

During normal operation, the first and second tapers of the first and second arms 38, 40 and the complimentary configuration of the first and second grooves 58, 60 effectively reduce any lateral or vertical movement of the steering column assembly 20. The first capsule portion 30 will remain engaged with the second capsule portion 32 by operation of the frictional forces between the first and second arms 38, 40 the first and second grooves 58, 60, the first and second set of fingers 52, 54, and the first and second raised portions 48, 50.

During an impact event, a driver may contact the steering column assembly 20. As a result of the contact, the driver will exert a force on the steering column assembly 20. If the force is in excess of the predetermined impact force necessary to overcome the coefficient of friction resisting separation of the first and second capsule portions 30, 32 and deform and/or shear the restraint device 72, the first and second capsule portions 30, 32 separate from each other. Separation of the steering column mounting capsule 34 into the first and second capsule portions 30, 32 releases the bracket 28 from the mounting device 36 facilitating collapse of the steering column assembly 20 along the longitudinal axis 24. In this way, the mounting capsule 34, the restraint device 72, and the steering column assembly 20 absorb a portion of energy resulting from the contact between the driver and the steering column assembly 20 during the impact event.

A second embodiment of the mounting capsule 34 as described above comprises the first and second arms 38, 40 including only the first taper. The first and second grooves 58, 60 are tapered in a complementary configuration to the first and second arms 38, 40 for receiving the first and second arms therein A third embodiment of the mounting capsule 34 as described comprises the first and second arms 38, 40 disposed on the first central body 42 at an angle away, or declining from the longitudinal axis 24.

Figure 6:
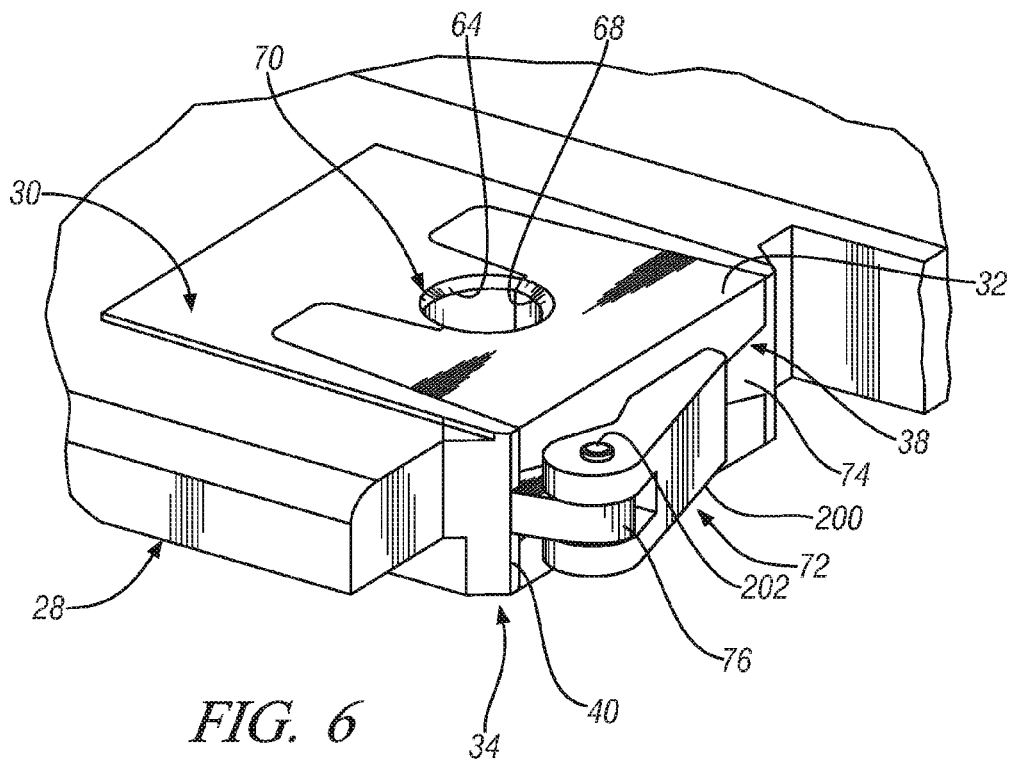
FIG. 6 is a perspective view of another embodiment of the first capsule portion coupled to the second capsule portion and biased together by a restraining device comprising a cam lock and a first shear pin.
Figure 7:
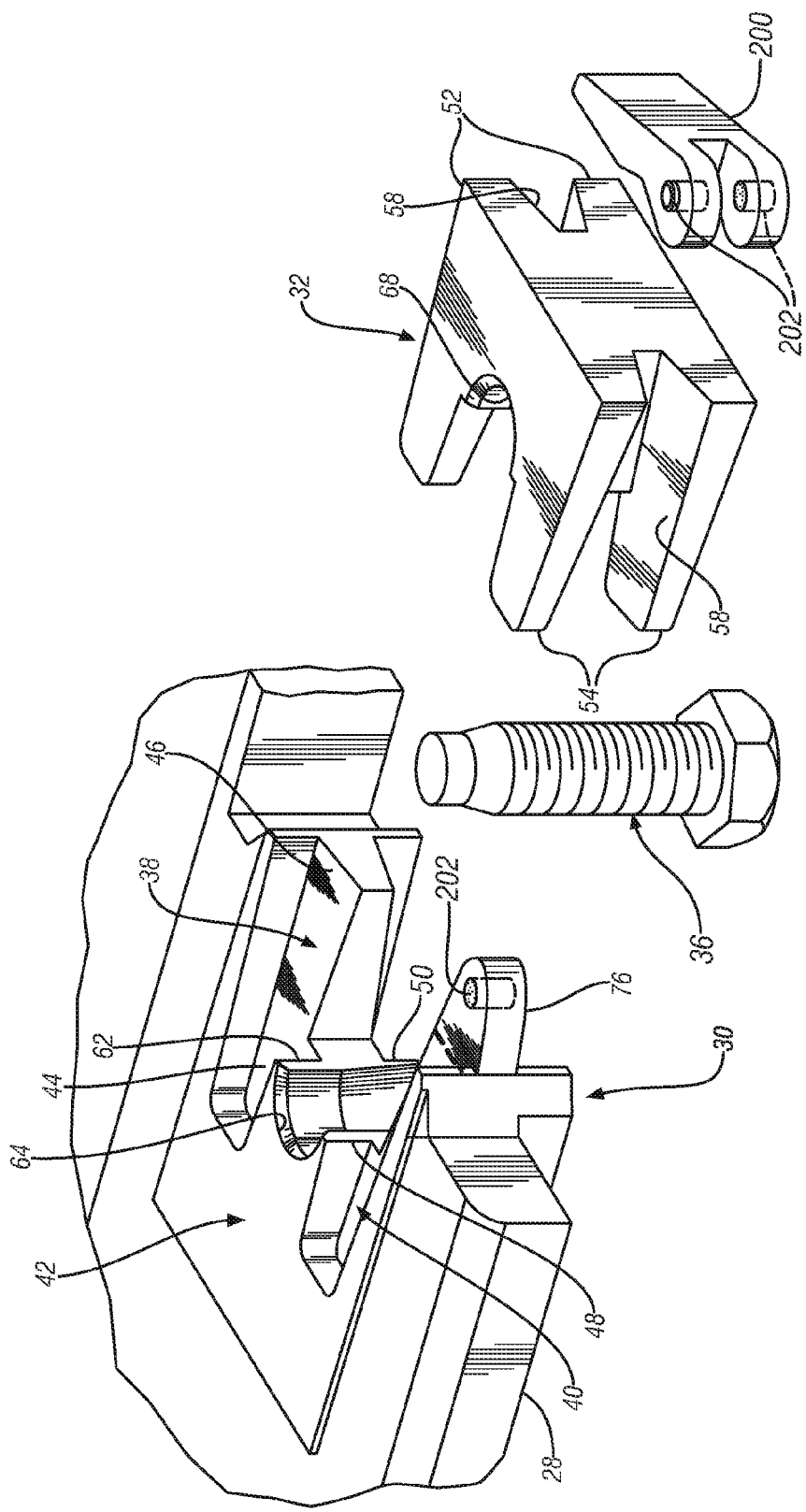
FIG. 7 is a perspective view illustrating the second capsule portion disengaged from the first capsule portion of the embodiment of FIG. 6.

Referring to FIGS. 6 and 7, a fourth embodiment of the mounting capsule 34 as described above is illustrated wherein the first capsule portion 30 comprises the first arm 38 defining the receiver 74. The restraint device 72 comprises a cam lock 200 and a first shear pin 202. The first shear pin 202 mounts the cam lock 200 to the second receiver 76. The cam lock 200 engages the second capsule portion 32 for restraining the second capsule portion 32 in engagement with the first capsule portion 30 until released in response to a predetermined impact force.

Figure 8:
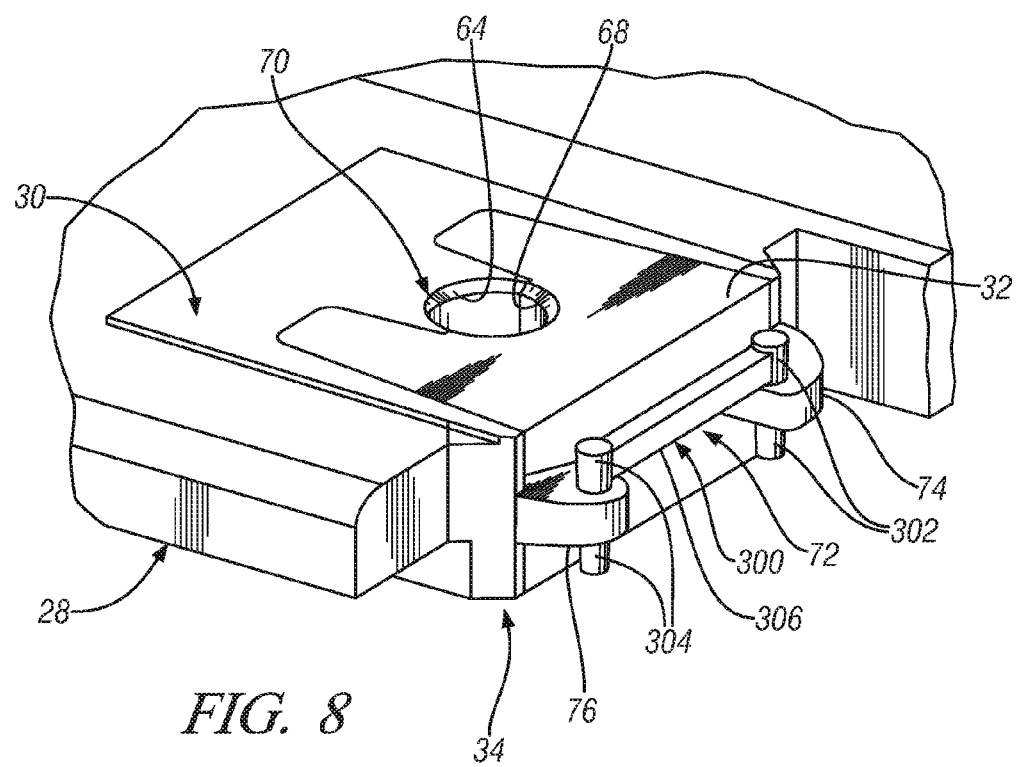
FIG. 8 is a perspective view of another embodiment of the first capsule portion coupled to the second capsule portion in which the first capsule portion is coupled to the second capsule portion and biased together by a restraining device comprising a shear pin apparatus having a body, a second shear pin, and a third shear pin.
Figure 9:
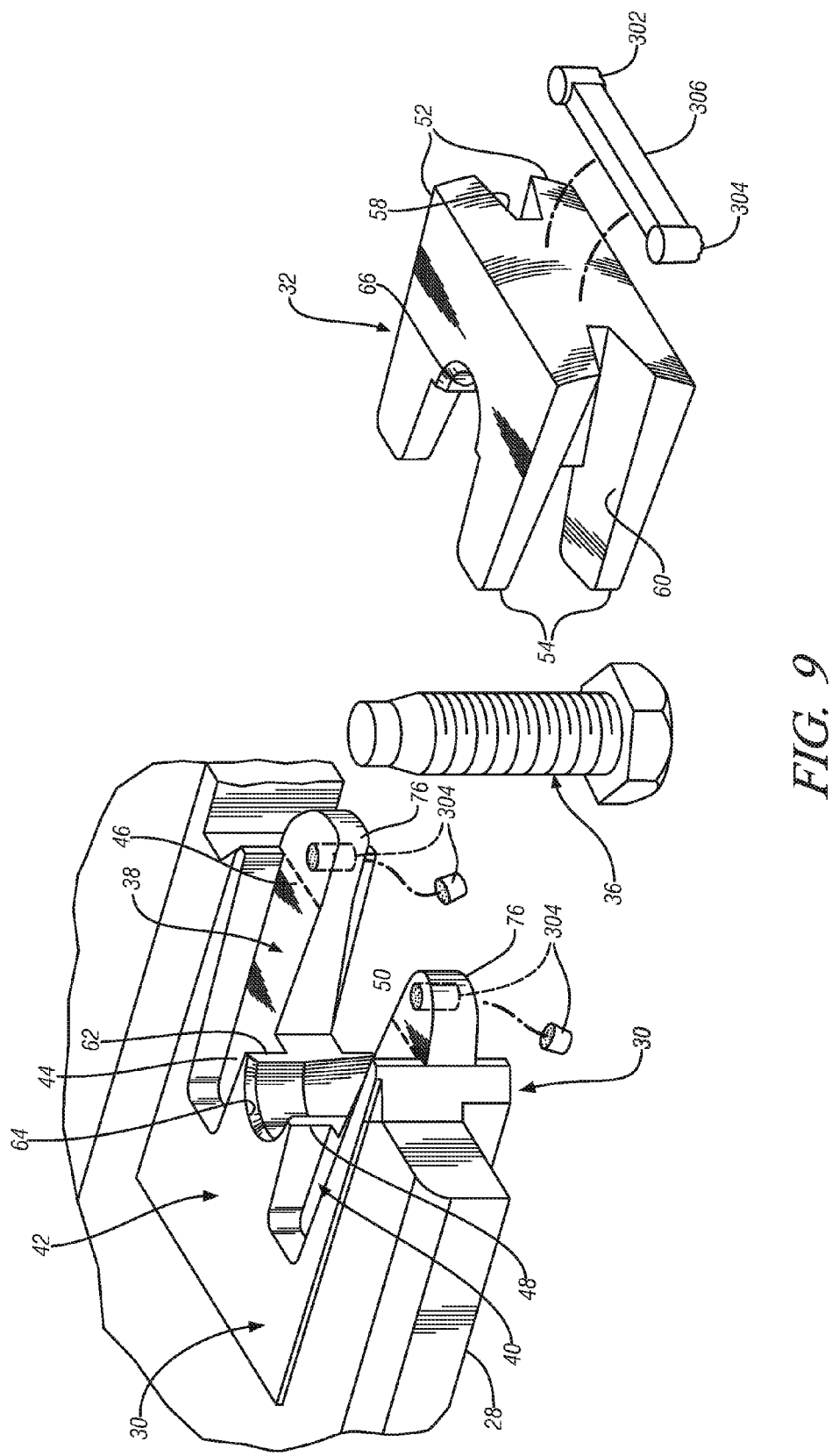
FIG. 9 is a perspective view illustrating the second capsule portion disengaged from the first capsule of the embodiment of FIG. 8.

Referring to FIGS. 8 and 9, a fifth embodiment of the mounting capsule 34 as described above is illustrated wherein the restraint device 72 comprises a shear pin apparatus 300 having a second shear pin 302 and a third shear pin 304 disposed on a body 306. The second shear pin 302 is mounted to the first receiver 74 and the third shear pin 304 is mounted to the second receiver 76. The body 306 engages the second capsule portion 32 for restraining the second capsule portion 32 in engagement with the first capsule portion 30 until released by severance of the shear pin 302, in response to a predetermined impact force.

Figure 10:
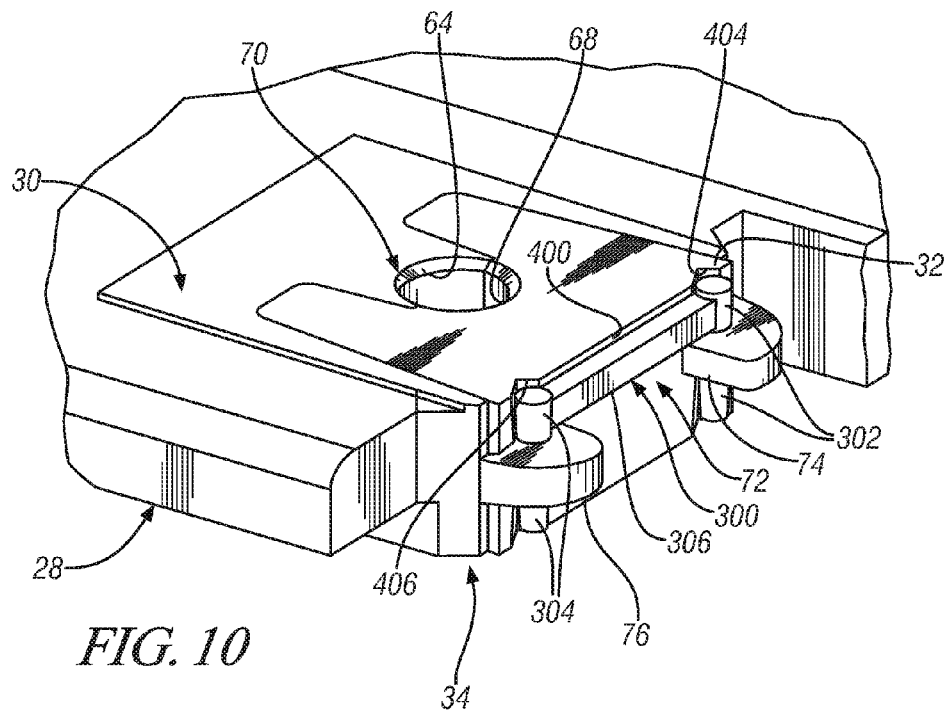
FIG. 10 is a perspective view of another embodiment of the first capsule portion coupled to the second capsule portion.
Figure 11:
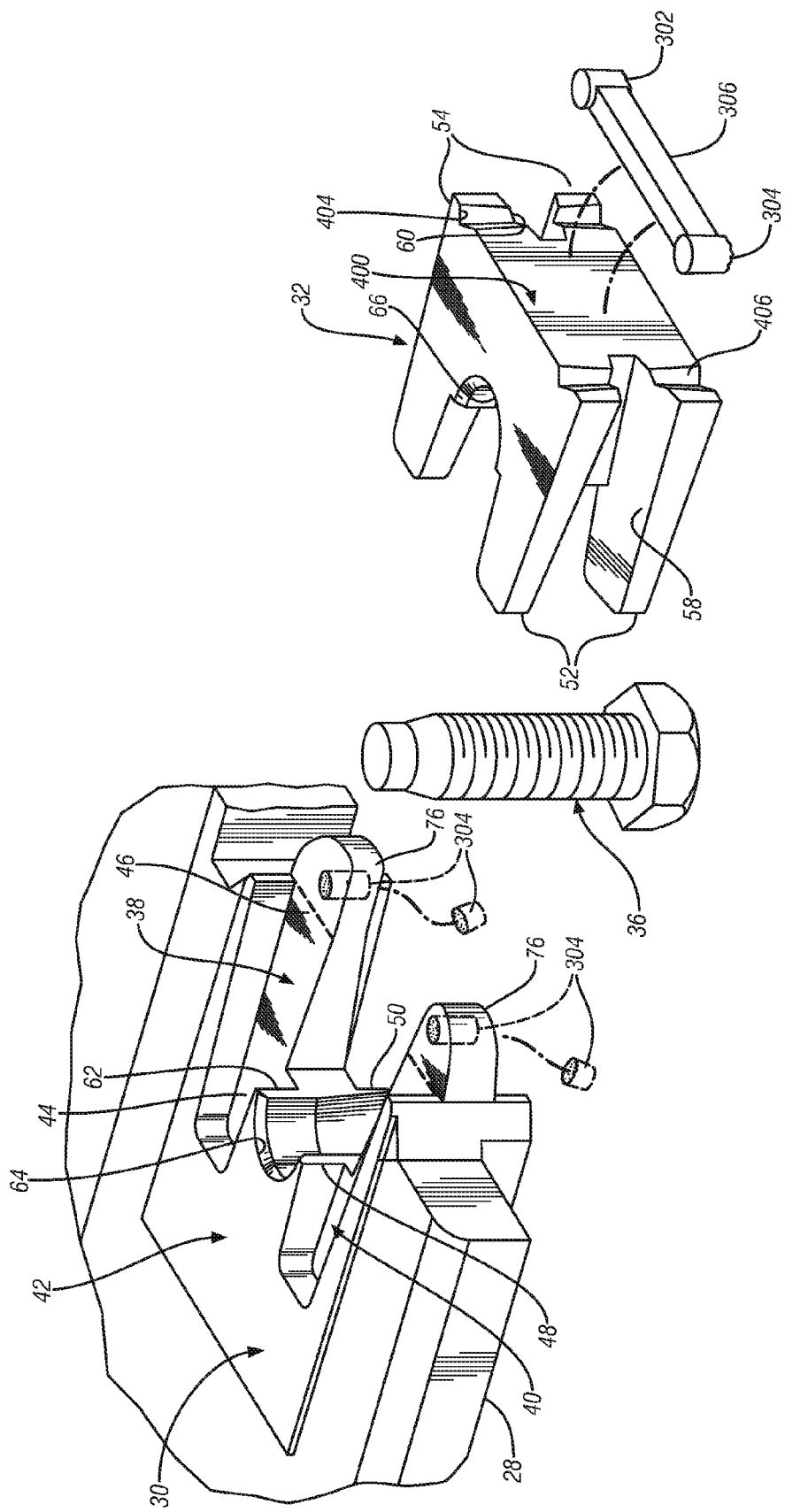
FIG. 11 is a perspective illustrating the separation of the second capsule portion from the first capsule portion of the embodiment of FIG. 10.

Referring to FIGS. 10 and 11, a sixth embodiment of the mounting capsule 34 as described above is illustrated wherein the second capsule portion 32 comprises the first set of fingers 52 and the second set of fingers 54 each terminating at a common end 400. The common end 400 may define first and second notches 404 and 406 that are configured to partially receive the second and third shear pins 302, 304 of the shear pin apparatus 300, respectively.

Figure 12:
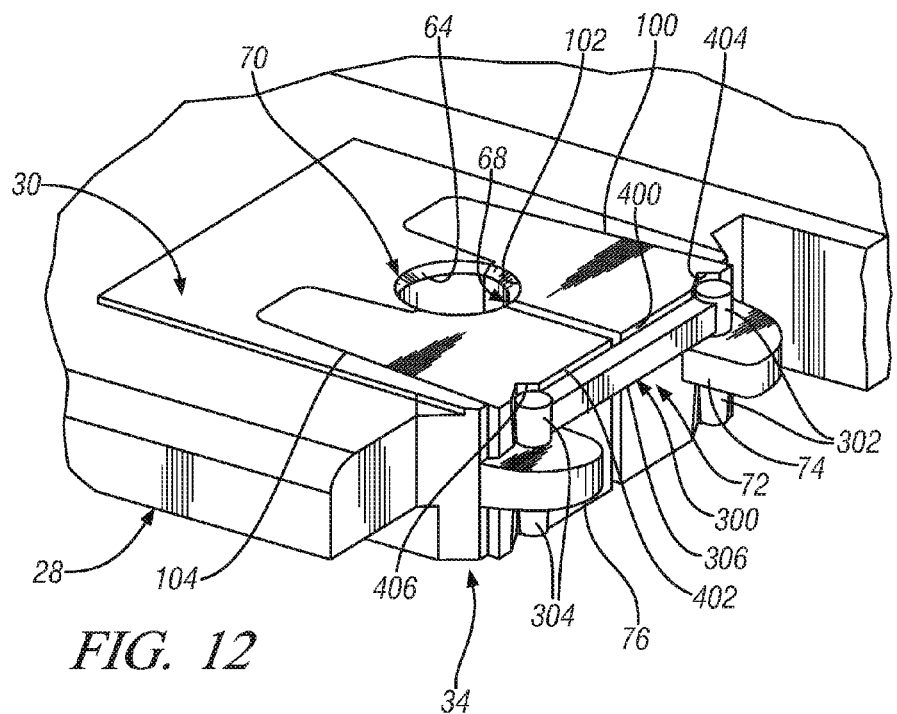
FIG. 12 is a perspective view of another embodiment of the first capsule portion coupled to the second capsule portion.
Figure 13:
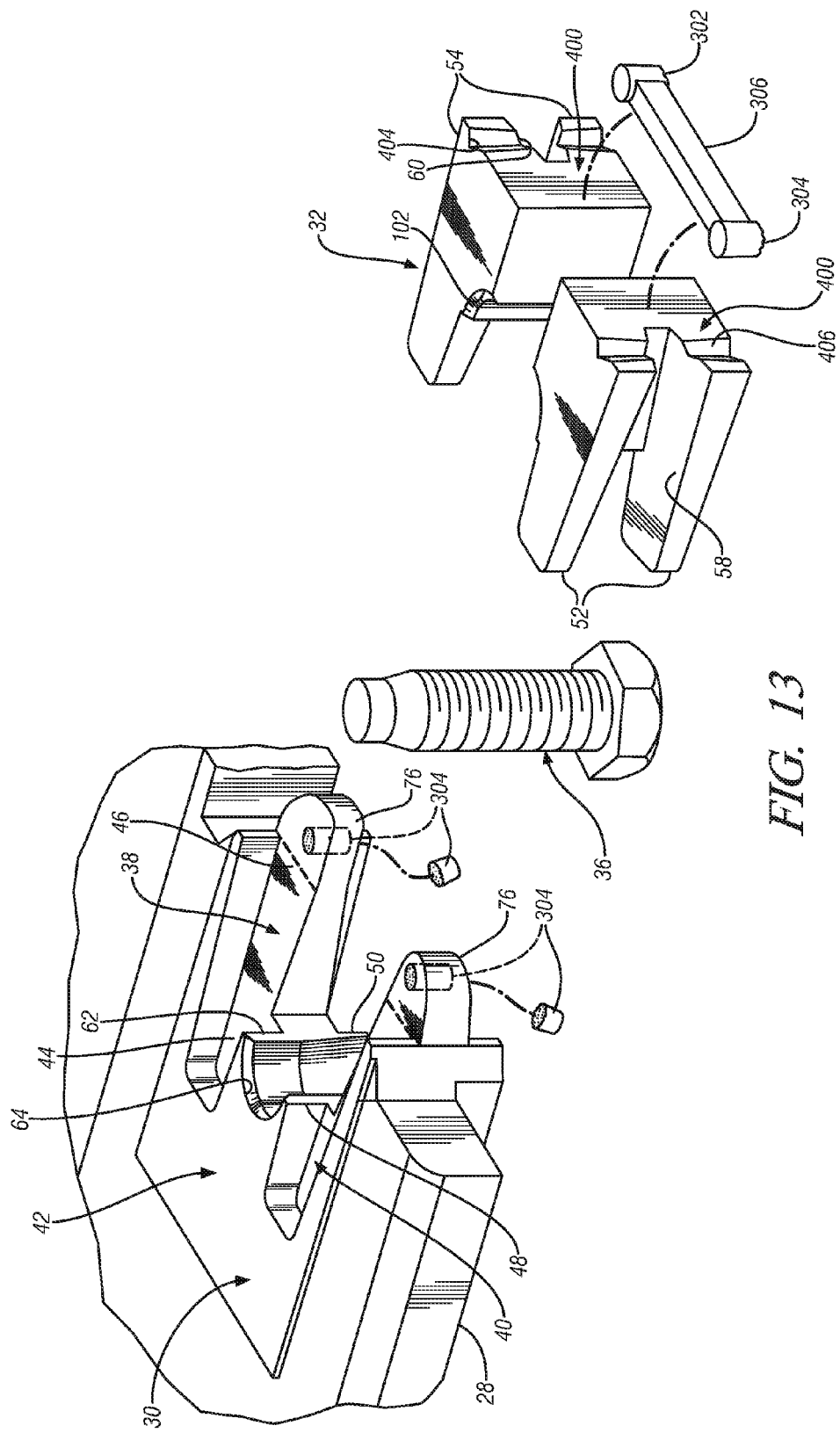
FIG. 13 is a perspective view illustrating the separation of the second capsule portion from the first capsule portion of the embodiment of FIG. 12.

Referring to FIGS. 12 and 13, a seventh embodiment of the mounting capsule 34 as described above is illustrated wherein the second capsule portion 32 includes a first half 100 defining a first portion 102 of the second recess 68 and a second half 104 defining a second portion 106 of the second recess 68, facing the first portion 102 when the first and second halves 100,104 are coupled together to define the second recess 68.

Figure 14:
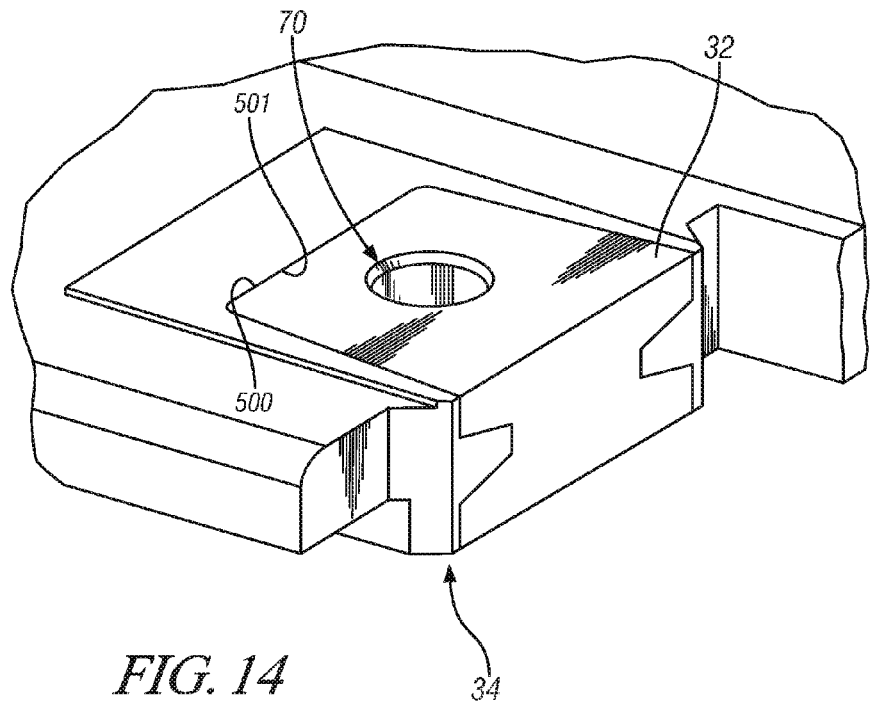
FIG. 14 is a perspective view of another embodiment of the first capsule portion coupled to the second capsule portion having an extended second central body.
Figure 15:
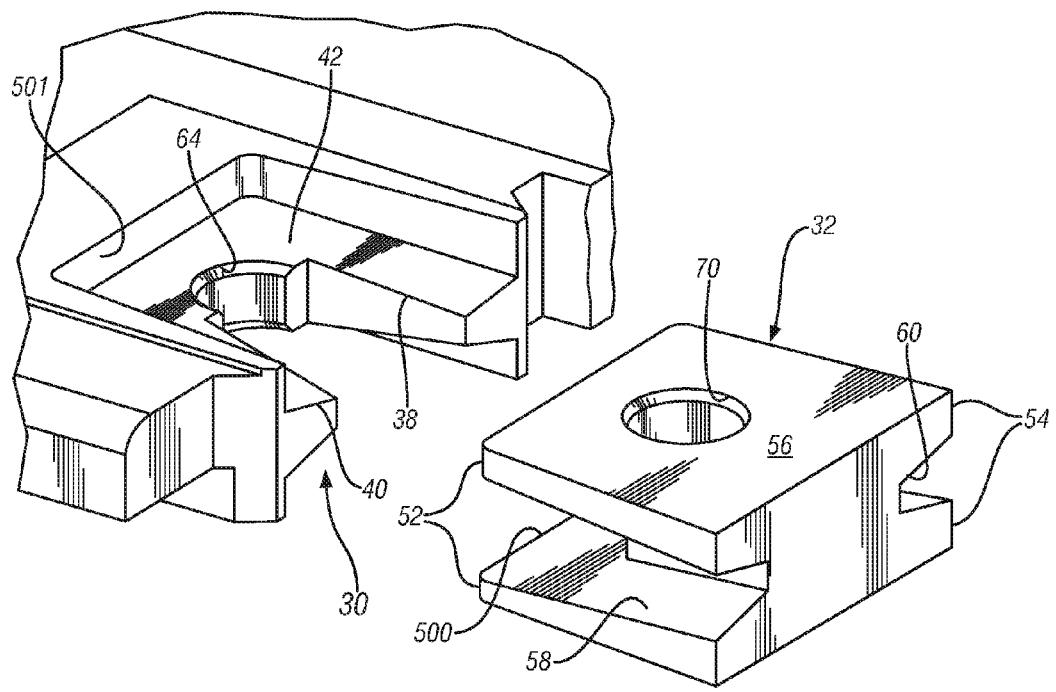
FIG. 15 is a partially disassembled view of the first capsule portion coupled to the second capsule portion comprising the extended second central body of FIG. 14.

Referring to FIGS. 14 and 15, an eighth embodiment of the mounting capsule 34 as described above is illustrated wherein the second central body 56 extends the same distance as the first and second set of fingers 52, 54 extend. The second central body 56 defines a front face or nose portion 500 that is received in a corresponding face pocket 501 in the first central body 42. The second central body 56 further defines the aperture 70.

While the forms of the invention herein disclosed constitute presently preferred embodiments, many others are possible. It is not intended herein to mention all the possible equivalent forms or ramifications of the invention. It is understood that terms used herein are merely descriptive, rather than limiting, and that various changes may be made without departing from the spirit or scope of the invention.

What is claimed is:

1. A steering column assembly for a vehicle comprising:
an outer jacket defining a longitudinal axis;
an inner jacket disposed along the longitudinal axis within the outer jacket;
a bracket coupled to one of the jackets;
a first capsule portion coupled to the bracket and including a first central body;

a first arm and a second arm each having a periphery and being spaced from each other with the first central body disposed between the first and second arms; and a second capsule portion coupled to the first capsule portion, the second capsule portion comprising a second central body and defining a first groove and a second groove spaced from each other and extending along the longitudinal axis with the first arm disposed in the first groove and the second arm disposed in the second groove, the first and second arms each defining a first taper extending from the periphery toward the first central body for reducing relative lateral movement of the inner and outer jackets;

wherein the first central body comprises a first recess portion, and the second central body comprises a second recess portion facing the first recess portion when the first and second capsule portions are coupled together to define an aperture for receiving a mounting device to attach the bracket to the vehicle.

2. A steering column assembly as set forth in claim 1, wherein the first taper extends from the periphery uniformly to the first central body.

3. A steering column assembly as set forth in claim 1, wherein the first and second grooves are tapered in a complementary configuration to the first and second arm tapers for receiving the first and second arms therein.

4. A steering column assembly as set forth in claim 1, wherein the first and second arms each define a first arm end adjacent the first central body and a second distal end spaced from the first central body with the arms defining a second taper extending from the first end towards the second distal end in combination with the first taper for reducing relative movement of the inner and outer jackets.

5. A steering column assembly as set forth in claim 4, wherein the first and second arms define the second taper extending from the first arm end uniformly to the second distal end.

6. A steering column assembly as set forth in claim 1, wherein the first and second arms are associated with and extend from the first central body and wherein the taper extends in a laterally declining angle from the longitudinal axis.

7. A steering column assembly as set forth in claim 1, wherein the first central body includes a first wall-portion extending above the first and second arms and a second wall-portion extending below the first and second arms.

8. A steering column assembly as set forth in claim 7, wherein the second capsule portion includes a first set of fingers further defining the first groove and a second set of fingers further defining the second groove with the first and second set of fingers abutting the first and second wall portions respectively when the first and second capsule portions are coupled.

9. A steering column assembly as set forth in claim 7, wherein the second central body is disposed between the first set of fingers defining the first groove and the second set of fingers defining the second groove opposite the first set of fingers.

10. A steering column assembly comprising:
an outer jacket defining a longitudinal axis;
an inner jacket disposed along the longitudinal axis within the outer jacket;
a bracket coupled to one of the jackets;
a first capsule portion coupled to the bracket and including a first central body;

a first arm and a second arm each having a periphery and being spaced from each other with the first central body disposed between the first and second arms; and a second capsule portion coupled to the first capsule portion, the second capsule portion defining a first groove and a second groove spaced from each other and extending along the longitudinal axis with the first arm disposed in the first groove and the second arm disposed in the second groove, the first and second arms each defining a first taper extending from the periphery toward the first central body for reducing relative lateral movement of the inner and outer jackets;

wherein the first central body includes a first wall-portion extending above the first and second arms and a second wall-portion extending below the first and second arms;

wherein the second capsule portion comprises a second central body disposed between the first set of fingers defining the first groove and the second set of fingers defining the second groove opposite the first set of fingers;

wherein the first central body comprises a first recess portion and the second central body comprises a second recess portion facing the first recess portion when the first and second capsule portions are coupled together to define an aperture for receiving a mounting device to attach the bracket to the vehicle.

11. A steering column assembly as set forth in claim 1, wherein the second capsule portion comprises a first half defining the first groove and a second half defining the second groove opposite the first groove when the first and second halves are coupled together to define the second capsule portion.

12. A steering column assembly for a vehicle comprising:
an outer jacket defining a longitudinal axis;
an inner jacket disposed along the longitudinal axis within the outer jacket
a bracket coupled to one of the jackets;
a first capsule portion coupled to the bracket and including a first central body and
a first arm and a second arm each having a periphery and being spaced from each other with the first central body disposed between the first and second arms; and
a second capsule portion coupled to the first capsule portion, the second capsule portion defining a first groove and a second groove spaced from each other and extending along the longitudinal axis with the first arm disposed in the first groove and the second arm disposed in the second groove, the first central body further comprising a first body end defining a first recess portion and the second central body further comprising a second body end defining a second recess portion facing the first recess portion when the first and second capsule portions are coupled together to define an aperture for receiving a mounting device to couple the bracket to the vehicle.

13. A steering column assembly as set forth in claim 12, wherein the aperture has a cylindrical configuration.

14. A steering column assembly as set forth in claim 12, wherein the second capsule portion comprises a first half defining a first portion of the second recess portion and a second half defining a second portion of the second recess portion to thereby define the second recess portion when the first and second halves are coupled together.

15. A steering column mounting apparatus for a vehicle comprising:
an outer jacket defining a longitudinal axis;
an inner jacket disposed along the longitudinal axis within the outer jacket;

a bracket coupled to one of the jackets;

a first capsule portion coupled to the bracket and including a first central body, a first arm and a second arm extending from the first central body in spaced relation from each other, each of the first arm and second arm having an outer periphery;

a second capsule portion coupled to the first capsule portion, the second capsule portion comprising a second central body and defining a first groove and a second groove extending in spaced relation from each other and extending along the longitudinal axis with the first arm disposed in the first groove and the second arm disposed in the second groove; and a restraint device engaging a first receiver defined by the first arm and configured to operatively restrain the second capsule portion in engagement with the first capsule portion and disengageable from the first and second capsule portions upon application of a predetermined impact force to the steering column along the longitudinal axis;

wherein the first central body comprises a first recess portion, and the second central body comprises a second recess portion facing the first recess portion when the first and second capsule portions are coupled together to define an aperture for receiving a mounting device to attach the bracket to the vehicle.

16. A steering column mounting apparatus for a vehicle comprising:

an outer jacket defining a longitudinal axis;

an inner jacket disposed along the longitudinal axis within the outer jacket;

a bracket coupled to one of the jackets;

a first capsule portion coupled to the bracket and including a first central body, a first arm and a second arm extending from the first central body in spaced relation from each other, each of the first arm and second arm having an outer periphery;

a second capsule portion coupled to the first capsule portion, the second capsule portion defining a first groove and a second groove extending in spaced relation from each other and extending along the longitudinal axis with the first arm disposed in the first groove and the second arm disposed in the second groove; and a restraint device engaging a first receiver defined by the first arm and configured to operatively restrain the second capsule portion in engagement with the first capsule portion and disengageable from the first and second capsule portions upon application of a predetermined impact force to the steering column along the longitudinal axis, wherein the restraint device comprises a cam lock and a first shear pin mounting the cam lock to the first receiver with the cam lock engaging the second capsule portion for restraining the second capsule portion in engagement with the first capsule portion until release of the cam lock in response to severance of the shear pin in response to the predetermined impact force.

17. A steering column mounting apparatus for a vehicle comprising:

an outer jacket defining a longitudinal axis;

an inner jacket disposed along the longitudinal axis within the outer jacket;

a bracket coupled to one of the jackets;

a first capsule portion coupled to the bracket and including a first central body, a first arm and a second arm extending from the first central body in spaced relation from each other, each of the first arm and second arm having an outer periphery;

a second capsule portion coupled to the first capsule portion, the second capsule portion defining a first groove and a second groove extending in spaced relation from each other and extending along the longitudinal axis with the first arm disposed in the first groove and the second arm disposed in the second groove; and a restraint device engaging a first receiver defined by the first arm and configured to operatively restrain the second capsule portion in engagement with the first capsule portion and disengageable from the first and second capsule portions upon application of a predetermined impact force to the steering column along the longitudinal axis, wherein the second arm defines a second receiver and the restraint device is coupled to the first and second receivers for restraining the second capsule portion in engagement with the first capsule portion until release of the restraint device in response to the predetermined impact force.

18. A steering column assembly as set forth in claim 17, wherein the restraint device comprises a spring member having a first restraint end and a second restraint end with the first restraint end mounted to the first receiver and the second restraint end mounted to the second receiver to bias the spring against the second capsule portion for restraining the second capsule portion in engagement with the first capsule portion until release in response to the predetermined impact force.

19. A steering column assembly as set forth in claim 17, wherein the restraint device comprises a shear pin apparatus having a second shear pin and a third pin disposed on a body with the second shear pin mounted to the first receiver and the third shear mounted to the second receiver with the body adjacent to and engaging the second capsule portion for restraining the second capsule portion in engagement with the first capsule portion until release in response to the predetermined impact force.

* * * * *